United States Patent
Angus et al.

[11] Patent Number: 5,857,351
[45] Date of Patent: Jan. 12, 1999

[54] TOY BALL ICE CREAM MAKER

[76] Inventors: Diana Patricia Angus; Robert David Angus, both of P.O. Box 299, Moss Beach, Calif. 94038

[21] Appl. No.: 858,798

[22] Filed: May 19, 1997

[51] Int. Cl.⁶ .................................................. A23G 9/10
[52] U.S. Cl. ........................................ 62/342; 366/130
[58] Field of Search ............................. 62/342, 457.2; 366/130

[56] References Cited

U.S. PATENT DOCUMENTS

| | | | |
|---|---|---|---|
| 174,150 | 2/1876 | Peck | 366/130 |
| 365,586 | 6/1887 | Davis | 366/130 |
| 4,179,904 | 12/1979 | McClenny | 62/342 |
| 4,920,761 | 5/1990 | Bukoschek | 62/342 |
| 5,255,533 | 10/1993 | Reilly | 62/457.2 |
| 5,275,015 | 1/1994 | Brossia et al. | 62/457.2 |
| 5,549,042 | 8/1996 | Bukoschek | 62/342 |

Primary Examiner—William E. Tapolcai
Attorney, Agent, or Firm—Robert Samuel Smith

[57] ABSTRACT

A toy ice cream maker being a preferably aluminum can with a lid insertable into a larger container wherein the larger container is encased in a spherical foam jacket. The smaller can has a lid and the larger can has a lid providing that ingredients for a frozen dessert may be inserted into the inner container and a mixture of rock salt and ice is insertable in the space between the inner and outer can. Another lid, formed integrally with the jacket seals the ice and rock salt in position. After the dessert ingredients have been sealed in the inner container and the rock-salt and ice have been sealed in the cooling container, the device, being a soft ball, is a toy that children delight in rolling around thereby hastening congealing the ingredients to form the dessert.

21 Claims, 2 Drawing Sheets

TOY BALL ICE CREAM MAKER

FIELD OF THE INVENTION

This invention relates to ice cream makers and particularly to an ice cream maker made as a toy ball

PRIOR ART AND INFORMATION DISCLOSURE

The original method of making "homemade" ice cream involves providing a container containing the appropriate amount of cream, milk sugar and flavor and placing the container in a mixture of salt (e.g., rock salt) and cracked ice. The contents are stirred for an extended period during which, the presence of the salt causes the ice to melt and absorb heat from the container thereby causing the contents of the container to convert to ice cream. The first ice cream maker was patented in 1848, and disclosed a hand crank for stirring the mixture.

The hand cranking step is lengthy and tedious. Adults and children alike often protest this task. Anticipation of eating fresh, homemade ice cream is often replaced by boredom and abandonment.

Numerous improvements of ice cream makers including the use of an electric motor for cranking and the introduction of modern methods of refrigeration.

For example, U.S. Pat. No. 4,920,761 to Bukoschek et al discloses an ice cream maker having a cylindrical container into which a discoid cold cartridge is insertable. A gear unit engages an electric motor with a stirrer inside the container. The cartridge is first placed in a freezer to lower its temperature then is placed into the container. Ingredients for ice cream are then poured into the container and the contents are stirred to form the ice cream.

U.S. Pat. No. 5,549,042 to Bukeschek discloses a domestic appliance for making ice cream with an extended speed range for stirring and a timer.

However, none of the improvements have captured the nostalgia of making "home made ice cream the good old fashioned way" and converted the process to a toy for the entertainment of family or party members.

SUMMARY

Accordingly, it is an object of this invention to elevate the making of homemade ice cream to fun for members of the family with the added incentive of producing home made ice cream.

It is another object to provide an ice cream maker whose operation is noiseless.

It is a further invention that the act of making the ice cream becomes a central funfilled activity. The anticipated product of this lively activity can be a healthy desert, made in the home without the additives or preservatives that are known to be included in many commercial brands. The dessert can be formulated using special home recipes such as with low fat ingredients.

It is another object that the activity, practiced in accordance with this invention, also has great educational value. It encourages the child to reflect on his/her diet and to take an interest in the important concern of preparing his/her food.

It is yet another object to stimulate the child to ponder certain scientific principles since his/her curiosity will be aroused concerning the interaction of the ice, salt and nutrients to produce the wondrous product—home made ice cream.

This invention is directed toward a double walled container having an inner compartment where the nutrients of the frozen dessert are placed, and a space between the inner container and an outer container where ice and rock salt are placed. Lids are provided for sealing both the inner container and retaining the ice and salt in the space between the inner and outer container.

The double walled container is inserted through an opening into an outer ball which is a soft material preferably foam. The lid of the container is formed integrally with a lid to the opening. With the innermost container containing nutrients, ice and salt in the space between the double walls, and the lid on the opening, the device is now prepared for children to roll back and forth to one another as in a game, all while ice cream forms in the container. The invention thereby performs as an ice cream maker, a toy and an educational device.

In one embodiment of the invention, a handle is attachable to the ball so that it can be pushed or pulled by grasping the handle.

The invention will be described in further detail with reference to the drawings showing embodiments of the invention to which, however, it should not be restricted.

DESCRIPTION OF A PREFERRED MODE

Figure 1:
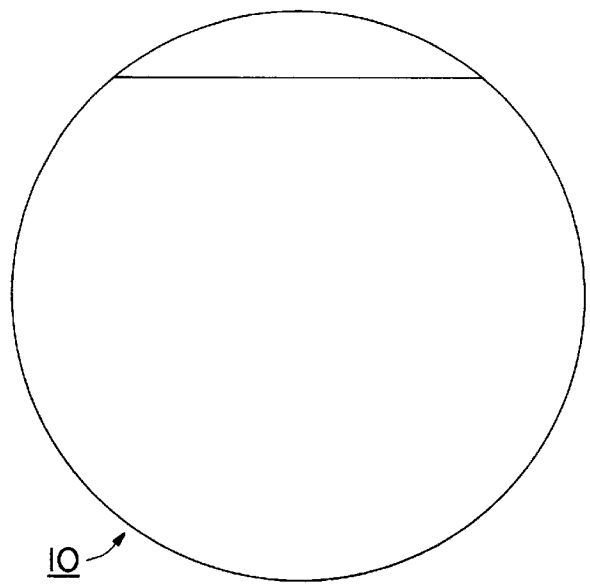
FIG. 1 shows the assembled invention.
Figure 2:
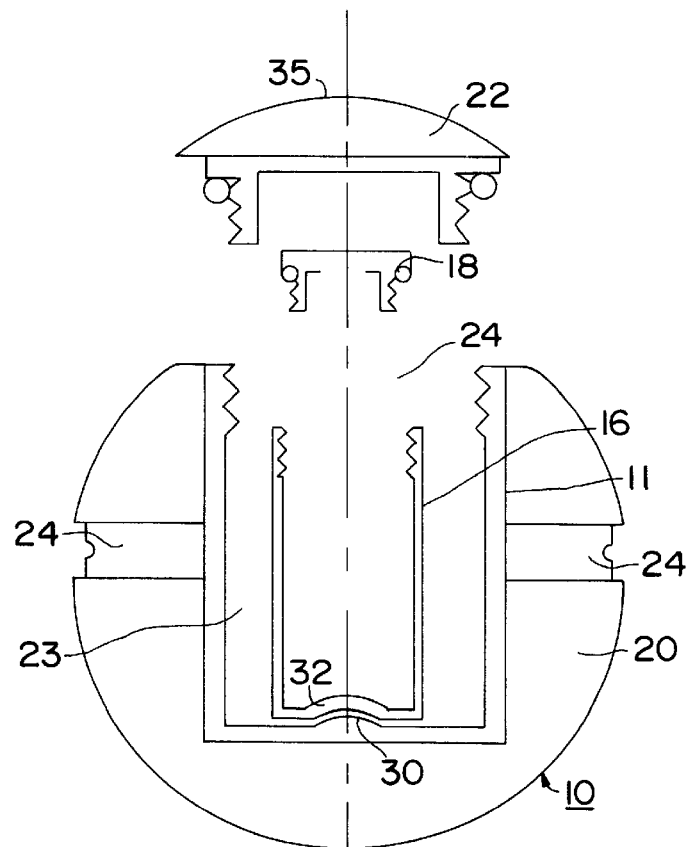
FIG. 2 is a sectional view of FIG. 1.

Turning now to a discussion of the drawings, FIG. 1 shows an assembled view of the invention 10 and FIG. 2 is a sectional exploded view of FIG. 1.

There is shown a freezing container 16 for containing ice cream nutrients. Lid 18 to container 16 has a threaded extension 19 with an O-ring seal 17 which screws onto and seals freezing container 16. The freezing container 16 is removably inserted into a cylindrical cooling container 11. The bottom wall of the freezing chamber is seated in the cooling chamber by a protrusion 30 of the cooling chamber mating with the concave bottom 32 of the freezing container.

The cooling container 11 is preferably plastic such as polyethylene. The cooling container 11 is encased in a spherical jacket 20 that is preferably foam. A lid 22 to an opening 24 in the jacket 20 is integrally formed with a lid 24 screwable onto the cooling container 11 and sealed by O-ring 13.

In use, the nutrients are placed in the freezing container 16 and the freezing container 16 is positioned in the cooling container 11 with lid 18 screwed onto the freezing container 16. The space 23 between the cooling container 11 and the freezing chamber 16 is filled with ice and rock salt. Then the lid 22 is screwed onto the cooling container 16 so that the assembly 10 is substantially the round soft ball 10 of FIG. 1. The ball 10 is then tossed or rolled about as an object of play until the nutrients have congealed to form the dessert.

Figure 3:
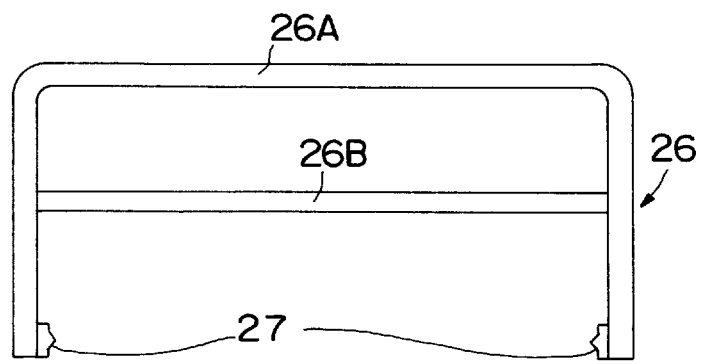
FIG. 3 shows the handle.

In another embodiment, two studs 24 are shown extending from opposite sides of the cooling container 11 onto which the ends 27 of handle 26 shown as a yoke in FIG. 3 may be engaged with which the ball may be pushed or rolled on the floor. The handle 26 has a tapered cone 28 on each handle end, each of which may be snapped into a recess on the extending end of each stud. The handle 26 attached to the ball can also be used as a hanger for storing the ball and a carrier. The handle yoke 26 may be formed with one support member 26A or two support members 26A snd 26B.

The outside foam jacket serves several purposes. The foam is an effective thermal insulator. The soft exterior surface of the ball is safe to toss and suited for the roughhouse play of the child.

A large number of recipes are known in the art of making frozen desserts that can be used to make sherbets, sorbets, ice creams etc. One recipe for making "old fashioned" ice cream is:

mix: 2 cups of "half and half" (half cream, half milk)
one and one half cups of sugar
one teaspoon of vanilla
one half cup of chocolate cocoa powder.
stir in: two cups of cream Variations and modifications of the invention may be suggested by reading the specification and studying the drawings which are within the scope of the invention.

For example, the jacket may comprise any one of a number of soft materials other than plastic foam.

Figure 4:
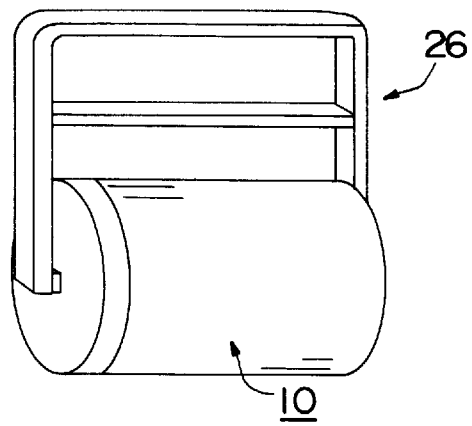
FIG. 4 shows the invention as a cylinder

The outside shape of the jacket may be cylindrical as shown in FIG. 4 instead of spherical.

The outside surface of the spherical toy-ice cream maker may be decorated.

Other possible materials could include foam rubber, neoprene or urethane.

I therefore wish to define the scope of the invention by the appended claims.

What is claimed is:

1. A toy device for making frozen desserts and providing entertainment by rolling said device which comprises:
    a freezer container means having an attachable freezer lid means for closing a freezer opening in said freezer container means, said freezer container means being adapted for containing ingredients of said dessert;
    a cooler container means having a chamber for holding said freezer container means wherein said chamber has a size sufficiently large and adapted to permit inserting a mixture of ice and rock salt in a space inside said chamber and outside said freezer container;
    said cooler container means having a cooler opening permitting inserting said freezer container means into said chamber;
    a cooler lid means for covering and sealing said cooler opening in said cooler container means;
    a jacket means for enclosing said cooler container means and having an outside surface adapted for rolling on a surface and with a jacket opening for inserting said freezer container means in through said jacket opening and cooler opening into said chamber of said cooler container means providing that when, said ingredients are inserted into said freezer container and said freezer lid is engaged with said freezer container, means and a mixture of ice and rock salt is inserted in a space inside said chamber and outside said freezer container means and said cooler lid is engaged with said cooler container means and then said device is rolled on said spherical surface for a sufficient length of time, said ingredients will congeal into said dessert.

2. The device of claim 1 wherein said outside surface of said jacket means has a spherical shape.

3. The device of claim 1 wherein said outside surface of said jacket means has a cylindrical shape.

4. The device of claim 1 wherein said jacket means is selected from a group of materials that consists of foam plastic and neoprene.

5. The device of claim 1 wherein said freezer container means comprises a cylindrical can.

6. The device of claim 5 wherein said can comprises aluminum.

7. The device of claim 5 wherein said can comprises metal.

8. The device of claim 5 wherein said can comprises plastic.

9. The device of claim 1 wherein said cooler container means comprises a cylindrical can.

10. The device of claim 1 wherein said cooling container means comprises plastic.

11. The device of claim 1 wherein said cooling container means comprises metal.

12. The device of claim 1 wherein said jacket means has a jacket lid for said jacket opening formed integrally with said cooler lid.

13. The device of claim 1 wherein said cooler opening has a thread and said cooler lid has a thread dimensioned to engage said cooler opening.

14. The device of claim 13 which comprises an O-ring operably arranged to seal said cooler opening to said cooler lid.

15. The device of claim 5 wherein said freezer opening has a thread and said freezer lid means comprises a lid with a thread engaging said thread in said freezer opening .

16. The device of claim 15 which further comprises an O-ring seal operably arranged in combination with said threaded freezer opening to seal ingredients in said freezer container means.

17. The device of claim 1 wherein said cooling container means comprises a cylindrical shape.

18. The device of claim 5 wherein said cooling container means comprises a cylindrical shape with a cooler bottom and said frezer container means has a freezer bottom contoured to engage said cooler bottom and permit said cylindrical can to be centered in said cooling container means.

19. The device of claim 1 which comprises a handle means detachably engaging said outside surface of said jacket adapted to permit pushing, pulling and rolling said device.

20. The device of claim 19 wherein said handle is a yoke with two end means for detachably engaging opposite locations on said outside surface of said device.

21. A toy device for making frozen desserts and providing entertainment by rolling and throwing said device which comprises:
    a freezer container means having an attachable freezer lid means for closing a freezer opening in said freezer container means, said freezer container means being adapted for containing ingredients of said dessert;
    a cooler container means having a chamber for holding said freezer container means wherein said chamber has a size sufficiently large and adapted to permit inserting a mixture of ice and rock salt in a space inside said chamber and outside said freezer container;
    said cooler container means having a cooler opening permitting inserting said freezer;
    container means into said chamber;
    a cooler lid means for covering and sealing said cooler opening in said cooler container means;
    a jacket means for enclosing said cooler container means and having an outside surface which is made of foam and has a spherical shape adapted for rolling on a surface and with a jacket opening for inserting said freezer container means in through said jacket opening and cooler opening into said chamber of said cooler container means providing that when, said ingredients are inserted into said freezer container and said freezer lid is engaged with said freezer container means and a mixture of ice and rock salt is inserted in a space inside said chamber and outside said freezer container means and said cooler lid is engaged with said cooler container means and then said device is rolled on said spherical surface and thrown for a sufficient length of time, said ingredients will congeal into said dessert.

* * * * *